106-90.   AU 116    EX
11-5-74   XR   3,846,366

United States Patent [19]
Wallace

[11] 3,846,366
[45] Nov. 5, 1974

[54] STRUCTURAL MATERIAL AND METHOD

[76] Inventor: Richard A. Wallace, 43 Kingscote Garden, Stanford, Calif. 94305

[22] Filed: Nov. 22, 1971

[21] Appl. No.: 201,111

[52] U.S. Cl.............. 260/37 EP, 106/90, 260/37 M, 260/37 N, 260/37 PC, 260/38, 260/40, 260/41 A
[51] Int. Cl............................................ C08g 51/04
[58] Field of Search ....... 106/90; 260/40, 861, 40 R

[56] References Cited
UNITED STATES PATENTS

| | | | |
|---|---|---|---|
| 3,078,249 | 2/1963 | Russell | 260/40 R |
| 3,227,665 | 1/1966 | Fourcode et al. | 260/40 R |
| 3,383,228 | 5/1968 | Rekate et al. | 106/90 |
| 3,386,394 | 6/1968 | Heise | 264/332 |

FOREIGN PATENTS OR APPLICATIONS

| | | | |
|---|---|---|---|
| 1,010,043 | 11/1965 | Great Britain | 260/40 R |
| 1,165,931 | 10/1969 | Great Britain | 106/90 |

OTHER PUBLICATIONS

Modern Plastics Encyclopedia, 1970–1971, (Oct. 1970, Vol. 47, No. 10A) pp. 334–335.

Bjorksten, ed., Polyesters and their Applications (TP986P6B5-A.U.145), p. 190, (Sept. 1962).

Doyle, The Development and Use of Polyester Products, (TP1180.P6D6-A.U.145), p. 143 (Mar. 1969).

Primary Examiner—Morris Liebman
Assistant Examiner—S. M. Person
Attorney, Agent, or Firm—Flehr, Hohbach, Test, Albritton & Herbert

[57] ABSTRACT

A composition comprising an intimate bonded mixture of (a) a major portion of a particulate reinforcement filler formed of the pyrolysis or incineration residue of industrial or municipal solid waste products and (b) a minor portion of a resinous thermosetting (e.g. polyester or epoxy) or thermoplastic (e.g. nylon) adhesive polymer. Also, a process in which the binder in a flowable castable polymerizable state is mixed with the above filler and molded into a desired shape prior to solidification.

23 Claims, No Drawings

STRUCTURAL MATERIAL AND METHOD

BACKGROUND OF THE INVENTION

A number of cast resinous objects have been produced which employ inert fillers dispersed throughout a thermosetting resin such as polyester. Known filler materials include limestone (calcium carbonate), glass fibers, asbestos, cinders, silicates, metal powders, quartz, clay, sand, alumina, volcanic ash, and the like.

It is common practice to mix several inert fillers with a resin binder to form a product of the desired properties. For example, it is well known that spherical particle shapes may be highly loaded in the binder but that such shapes do not form as strong an adhesive bond as do irregular shaped particles. On the other hand, irregular shaped particles of a generally uniform grade do not pack very well and so a greater proportion of binder must be employed.

It is recognized that a polyester forms an extremely strong bond with a free metal in comparison to that formed with a metal oxide. However, free metals from conventional sources are relatively expensive. Therefore, a product employing a free metal would be uneconomical for most purposes.

A composition formed of a polyester binder with calcium carbonate filler has been employed for a variety of synthetic marble products. Among the deficiencies of calcium carbonate filler is the relatively low tensile strength of the final product. Thus the product would have limited industrial application. Furthermore, since calcium carbonate is highly reactive with acid, a surface formed with it as a filler may be permanently disfigured by acid contact.

SUMMARY OF INVENTION AND OBJECTS

It is a general object of the present invention to provide a composition with superior structural, chemical and electrical characteristics in comparison to the ones described above.

It is a particular object of the invention to form a valuable structural material using a majority of inexpensive pyrolysis or incineration waste residue as a filler.

It is another object of the invention to provide a composition of the above type which can be easily molded to any desired configuration such as for large diameter pipes.

It is still another object of the invention to provide a composition of the above type having a smooth surface with low frictional resistance as for use in the inner wall of a pipe and which is safe for use in domestic objects such as formed sinks or playground equipment.

Other objects and features of the present invention will be apparent from the following description.

DETAILED DESCRIPTION OF THE PREFERRED EMBODIMENTS

The present invention is predicated upon a discovery that the pyrolysis or incineration residue of industrial or municipal solid waste products is an excellent particulate reinforcement filler material when intimately mixed with an adhesive resinous polymer binder. The invention is particularly useful when carried out in close proximity to the pyrolysis or incineration plant so that large shipment costs of the residue are avoided.

Unless specifically designated to the contrary, the term "particulate filler" shall refer to any residue from the pyrolysis or incineration of industrial or municipal solid waste products.

In carrying out the process of the present invention, a major portion of particulate filler is intimately mixed with a minor portion of flowable castable polymerizable resin binder precursor. Thereafter, a mold of a desired configuration is filled with the mixture in a flowable state and the binder precursor is polymerized to form a solid molded structural composition in which the binder is adhesively bonded to the filler particles.

A typical incineration residue particulate filler according to the present invention is formed in a municipal incinerator to which a continuous feed of solid refuse is supplied. The incinerator gaseous environment is normally maintained with an excess of oxygen at approximately atmospheric pressure. A typical combustion temperature range of between 1600°–1900°F is employed. The waste material residence time may average about 30 minutes. A refuse or garbage feed for the incinerator may include raw paper, vegetable waste, glass, film, rocks, earth, plastics, ceramics, metals, wood, rubber, and the like.

A typical analysis of a municipal incinerator residue produced from the above raw waste material incinerated in the above manner is set forth in the following table.

TABLE I

| MUNICIPAL INCINERATOR RESIDUE | |
|---|---|
| Content | Percentage |
| Silica ($SiO_2$) | 30–42 |
| Alumina ($Al_2O_3$) | 18–22 |
| Titania ($TiO_2$) | 1.0–3.0 |
| Iron Oxide ($Fe_2O_3$) | 9.0–12.5 |
| Copper Oxide (CuO) | Trace |
| Calcium Oxide | 11.5–15 |
| Magnesium Oxide | 2.3–4.0 |
| Zinc Oxide | 0.5–1.0 |
| Lead Dioxide | Trace |
| Carbon | Trace |
| Metals (Ferrous and non-ferrous) | 7–11 |

A residue from the pyrolysis of municipal or industrial residue may also be employed as the particulate filler. A typical pyrolyzed residue is formed by feeding shredded waste or garbage of the type described with respect to incineration to a rotating refractory-lined kiln. In the kiln, the waste is heated in an oxygen-deficient atmosphere to decompose organic matter into gaseous products, carbon, and ash. Complete pyrolysis or heat decomposition is accomplished by heating the waste to a sufficiently high temperature prior to exiting the kiln. A typical pyrolysis residue is shown in the following table.

TABLE II

| Content | Percentage |
|---|---|
| Glass and rocks | 30–45 |
| Metals | 25–35 |
| Primary carbon | 15–20 |
| Ash (inert metallic oxides) | 25–30 |

A fine (−100 mesh) carbon-rich fraction may be separated from the residue, as for use in a filter for waste water treatment. The remainder of the residue, conventionally used as land fill and the like, may be employed as a particulate filler according to the present invention. Also, the entire residue may be used as filler.

A typical pyrolysis unit employs an oxygen-free environment at about one atmosphere total pressure and a temperature of about 1900°F. Residence time varies between 20 and 30 minutes. A so-called vacuum or flash pyrolysis unit has been developed which operates at a temperature of about 900°F and a residence time of about 30 seconds.

The residue of pyrolysis even after primary carbon removal, or of incineration, contains trace quantities of carbon. Such carbon imparts a black homogeneous color to the final composition according to the present invention. However, as described hereinafter, different colors may be obtained by the addition of small quantities of pigment to the mixture prior to solidification. The presence of small amounts (e.g. up to 10 percent) of carbon in the particulate filler also increases the electrical conductivity of the final composition. This is important in the manufacture of static-free floor tiles and pipes.

The residues of pyrolysis and incineration are often passed through a magnetic separator in order to remove the iron and steel content. Depending upon the solids waste content of the initital composition, this may reduce the total free metals content by as much as 50 percent or more. In such case, of course, the total free metal content is essentially non-ferrous in nature. According to the present invention either the ferrous-rich or magnetically separated residue may be employed.

The individual particles of the waste residue possess a number of desirable characteristics for use as a filler. For example, an average residue is characterized by a non-homogeneous mesh size distribution ranging from −20 to +300 mesh. It is preferable that the majority of the filler particles vary in gradation from −4 to 320 mesh size. It is unnecessary to screen this material prior to use as a filler. It is apparent that the maximum degree of packing it enhanced by this wide distribution, an important consideration since it is economically desirable to employ a high proportion of filler in the final composition.

Another important characteristic of the individual particles of the filter is the irregular rough shape naturally produced during either pyrolysis or incineration. Such shapes tend to form a stronger adhesive bond with the polymeric binder than do smooth shapes. The rough surface texture also increases the strength of the resin-waste residue bonding by providing a high degree of mechanical interlocking between the residue particles and resin.

The particles of the filler have a generally non-porous structure so that there is no penetration by the flowable resin binder precursor. It is apparent that a deposit of the relatively expensive binder material within a porous filler structure would be wasteful since such deposit has no adhesive function.

The resin employed as a binder according to the present invention must fulfill certain requirements. It must be flowable or fluid prior to polymerization so that the composition may be cast. It also must be capable of adhesively bonding with a majority of filler particles to form a solid structural composition in a mold.

Thermosetting resins suitable for the present invention include epoxy resins formed from a mixture of epichlorohydrin and bisphenol, phenolic resins formed from formaldehyde and phenol, copolymers of natural or synthetic liquid rubber with styrene, polyesters formed from a mixture of a polyfunctional alcohol and a polyfunctional acid, and copolymers of vinylchloride and styrene. Other thermosetting resins which may be employed of the thermosetting type are aminos, alkyds, urethanes, silicones, cross-linked polyethylene, and the like.

A listing of polyester resin particularly suitable for the purpose of the present invention is described in the chapter entitled "Polyesters" by Edward H. Meyer, *Modern Plastics Encyclopedia*, issue for 1965, September, 1964, pp. 235–240 and the references cited therein and "Polyesters and Their Applications" by Bjorksten et al., Reinhold, N.Y., 1956.

Suitable castable polyesters comprise a solution in styrene of the esterification product of a glycol, such as propylene glycol and dibasic acids. The dibasic acids include phthalic anhydride, or isophthalic acid and maleic anhydride. When properly catalyzed with a peroxide, such as benzoyl peroxide or methylethylketone peroxide, the styrene reacts with the unsaturated maleic groups to form the thermoset resin. Only small amounts of catalyst, in the range of 0.5 to 1.0 percent, are employed.

Particularly effective phenolic resins have a molar ratio of formaldehyde to phenol in approximate ratio of from 2 to 3 parts to 1. These resins may be slowly cured by heating for 1–3 days at 70°–80°C or may be cured more rapidly (e.g. from 1 to 4 hours) at 20°C by the addition of small amounts (e.g. 1–5 percent) of acid.

If desired, the filler material of the present invention may be employed to reinforce a thermoplastic resin binder. Suitable ones include: nylon, polycarbonates, acrylics, acetals, vinyls, cellulosics, styrenes, chlorinated polyethers, fluorocarbons, polypropylene and polyethylene.

It has been found that a desired color may be imparted to a composition of the aforementioned type by the addition of a suitable pigment. For example, the composition may be colored red by the addition of iron oxide, white by the addition of titanium oxide, blue by the addition of phthalocyanine blue, green by the addition of phthalocyanine green, and so forth. It has been found that a relatively small percent of pigment, on the order of one-half percent or less, is sufficient to impart the desired color to the entire composition. The pigment is added to the binder and filler in the mixing stage. It is noted that the blended coloring effects of conventional synthetic marble may be obtained using a composition of the present invention.

The final composition of the present invention is characterized by high flexural, tensile, compressive, and impact strength set forth in detail hereinafter. In addition, it is exceptionally resistant to acid and, in general, to other corrosive chemicals. The surface is characterized by relatively high hardness and is easily machinable. Furthermore, the final composition will be formed with a smoothness comparable to that of the mold.

The materials show excellent weather-resisting properties against low temperatures and exposure to ultraviolet and infrared radiation for extended periods of time. Pipes formed of this composition show excellent dimensional stability and uniformity under either tensile or compressive loadings at extreme temperatures of −60° up to 300°F. These pipes are also essentially impermeable to water and brine sulfate solutions.

The composition of the present invention has high chemical resistivity. Thus it is particularly well suited for underwater structures such as exposed dam sections and beams in either fresh or salt water environments. Also, it is well suited for large diameter cast storage pressure vessels or tanks, especially for containing corrosive chemicals.

The above exceptional properties are obtainable in a relatively light weight material in comparison to those commonly used for a similar purpose, for example, steel-reinforced concrete used in large diameter pipes. Furthermore, the density of the present composition may be controlled by foaming with air (e.g. by agitation) to a desired specific gravity in the range of, say, 1.2 to 2.2. The use of common foaming agents or resins, such as polyurethanes, may also be employed for density control.

The mechanical properties of six different samples, prepared in accordance with the present invention, were compared with each other and with a seventh sample utilizing calcium carbonate filler. The ratio of filler to binder was maintained at a constant 74:26 percent by weight. The results are set forth in Table III below.

TABLE III

| Sample No. | Flexural Strength (psi) | Tensile Strength (psi) | Compressive Strength (psi) | Impact Strength (Ft. lb/in.) | Barcol Hardness |
|---|---|---|---|---|---|
| 1 | 22,000 | 6,300 | 23,000 | 0.50 | 67 |
| 2 | 22,500 | 7,800 | 23,800 | 0.50 | 66 |
| 3 | 22,400 | 8,100 | 23,700 | 0.50 | 69 |
| 4 | 18,800 | 5,100 | 19,900 | 0.30 | 67 |
| 5 | 18,000 | 3,900 | 19,300 | 0.30 | 63 |
| 6 | 19,500 | 5,800 | 20,200 | 0.30 | 68 |
| 7 | 16,600 | 2,200 | 18,400 | 0.30 | 56 |

COMPOSITION

| Sample No. | Filler | Binder |
|---|---|---|
| 1 | incinerator residue (−4 +300 mesh) | epoxy resin |
| 2 | pyrolysis residue (−20 +200 mesh) | epoxy resin |
| 3 | pyrolysis residue (−20 +200 mesh) (without magnetic separation) | epoxy resin |
| 4 | pyrolysis residue (−20 +200 mesh) | polyester resin |
| 5 | incinerator residue (−4 +300 mesh) | polyester resin |
| 6 | pyrolysis residue (−20 +200 mesh) (without magnetic separation) | polyester resin |
| 7 | $CaCO_3$ (80 mesh) | polyester resin |

*proportion 74% filler:26% binder

It is apparent that all of Samples 1–6 had markedly improved flexural strength, tensile strength, compressive strength and hardness when compared to the calcium carbonate-filled Sample 7. As expected, the epoxy resin was superior in mechanical properties to the polyester resin.

A suitable composition according to the present invention includes 60–90 parts by weight of filler and 10–40 parts by weight of binder. A preferable composition includes 70–85 parts by weight of filler and 15–30 parts by weight of binder. Above 90 parts by weight of filler, it is difficult to effectively bind the particles together to form a composition having the mechanical properties described above. Furthermore, the uniformity of the overall composition would suffer. As the proportion of the binder, which is much more expensive than the filler, is increased to, say, 40 parts by weight or more, the cost of the final composition becomes prohibitive for most applications.

Another conclusion may be drawn from the above data by the comparison of the mechanical properties of Samples 4 and 6. Both samples employ a polyester resin binder and differ only in the characteristic of the pyrolysis residue filler. A substantial portion of the ferrous metals has been removed from Sample 4 by magnetic separation whereas no such separation is performed in Sample 6. The flexural strength and tensile strength are superior for Sample 6. This is apparently caused by the strong adhesive bonding formed between the binder and metal surfaces.

It is apparent from the foregoing that a large variety of inexpensive molded compositions are produced according to the present invention. The aforementioned properties enable the material to be used as a self-supporting structure without the necessity of external support structure.

The composition is particularly well adapted for use in the molding of large diameter pipes or conduits, say, 2 feet or more in diameter. The conventional material presently used for that purpose is steel-reinforced concrete. This material is relatively expensive to form and is extremely heavy and cumbersome to work with. Furthermore, it has a rough coarse surface which creates large frictional losses by fluids flowing within the pipes. To avoid this, it is conventional to employ smooth linings within the pipes which increase their cost. In contrast, large diameter pipes produced in accordance with the present invention are less expensive, water-impervious, lighter, and have a smooth surface texture eliminating the need for lining.

In order to more clearly disclose the nature of the present invention, a number of specific examples of its practice are herein given. It should be understood, however, that this is done by way of example and is intended neither to delineate the scope of the invention nor limit that of the appended claims.

The smooth surface which is obtained simply by casting renders it suitable for any object with an unusual or irregular configuration. For example, it could be used in playground areas for unusual objects suitable for climbing. Also, the excellent mechanical and chemical properties render particularly well suited for floor and roof tiling.

EXAMPLE 1

A typical raw municipal garbage is incinerated in a rotary kiln incinerator at a temperature of 1750°F in an oxygen-rich environment at approximately atmosphere pressure with a residence time of about 30 minutes. The residue is glass rich and contains fine ash including char, dirt, coal, sand and slag as well as finely divided non-ferrous and ferrous metals and their oxides. A basic chemical composition is set forth in Table IV below.

TABLE IV

| Chemical Composition | Weight Percent |
|---|---|
| $SiO_2$ | 74.0 |
| $Al_2O_3$ | 3.5 |

TABLE IV-Continued

| Chemical Composition | Weight Percent |
|---|---|
| $Na_2O$ | 9.7 |
| $K_2O$ | 0.5 |
| CaO | 7.8 |
| MgO | 1.6 |
| $Fe_2O_3$, $Fe_3O_4$ | 2.2 |
| non-ferrous metals | |
| (Zn, Mn, Ca, Al, Ph, Ti, Sn, Ni, B) | 2.0–4.5 |
| magnetic particles | 2.0–5.0 |
| C (char and charcoal) | 0.3 |

A mixture of 200 pounds of promoted polyester resin of the type described above as a suitable castable polyester., 6 grams of dimethyl polysiloxane antifoam agent, and 450 pounds of particulate filler of the above type are thoroughly dispersed and blended in a residence time of about 5 minutes. One liter of methylethylketone peroxide catalyst together with one liter of ethyl acetate are also added to this resin-residue mixture. The total mixture is transferred into a 15 gallon pressure vessel. A steel follower plate is positioned onto the surface of the fluid mixture to seal the vessel. Air from a compressor is forced into the vessel to create a pressure of about 80 psi. The flowable slurry is then discharged under pressure into a mold by opening a gate valve connected to the bottom end of the pressure vessel.

The particular mold includes an opening for a 6-foot long pressure pipe with an internal diameter of 4 feet and a 0.75 inch wall thickness. A suitable mold includes an outer and inner cylinder with a 0.75 inch clearance therebetween. The mold is completely filled with the above mixture which is allowed to cure for two hours. The cast pipe is then removed from the mold.

EXAMPLE 2

A pipe is cast as in Example 1 utilizing a typical residue from the Black-Clawson urban garbage separation process which has a composition set forth in the following table.

TABLE V

RAW INCINERATOR RESIDUE FROM
THE BLACK-CLAWSON URBAN GARBAGE
SEPARATION PROCESS

| Chemical Composition | Weight Percent |
|---|---|
| $SiO_2$ | 70.2 |
| $Al_2O_3$ | 3.5 |
| $Na_2O$ | 12.0 |
| $K_2O$ | 0.3 |
| CaO | 9.8 |
| MgO | 2.6 |
| $Fe_2O_3$, $Fe_3O_4$ | 1.4 |
| Carbon | trace |

EXAMPLE 3

A method generally outlined in Example 1 is employed to produce a 2 foot long pressure pipe with an internal diameter of six feet and a wall thickness of 1.25 inches. The particulate filler employed is a so-called glass-rich residue from an urban garbage pyrolysis plant. That is, most of the fine particulate carbon residue is screened from the coarser glass-rich material. This residue is magnetically screened to recover the ferrous metals. A typical composition is set forth in Table VI below.

TABLE VI

RAW GLASS-RICH RESIDUE FROM
URGAN GARBAGE PYROLYSIS PLANT

| Chemical Composition | Percent by Weight |
|---|---|
| $SiO_2$ | 80 |
| $Al_2O_3$ | 4 |
| $Fe_2O_3$ | 5 |
| stones and slag | 0–3 |
| carbon residue | 1–5 |
| (Sb, Al, Sn, Fe, Ti, Zn powder) | 5–10 |

EXAMPLE 4

This example illustrates a semi-continuous manufacturing operation for producing 6-foot internal diameter pressure pipes with a 1.25 inch wall thickness and 2 feet in length. A continuous ribbon-flow mixer is employed in which the mixing blades are powered by a 5-horsepower motor to provide an operating capacity for the mixer of 7.5 tons per hour. The residence time of the viscous resin binder and particulate filler mixture in the barrel of the mixer is approximately 20 seconds.

To manufacture 150 pipes of the aforementioned size, the following quantities of raw materials are employed: polyester resin—2,500 gallons; raw residue particles from urban garbage incineration—30.5 tons; methylethylketone peroxide—225 lbs.; ethyl acetate—30 gallons; dimethyl polysiloxane—1.5 lbs.

A positive displacement pump is used to continuously feed the liquid promoted polyester resin and antifoam agent into the particulate residue filler.

The mixture of peroxide catalyst in ethyl acetate is separately supplied to the hopper of the continuous mixer by a small screw feeder. The mixture is then extruded directly into a sequential series of polyurethane pipe molds in a filling time of about 2 minutes without the application of external heat.

The mixture is cured in the molds for about 2 hours. About 150 pipes may be produced in the above manner in about 8 hours.

I claim:

1. A composition comprising an intimate mixture of 60 to 90 parts by weight of a particulate reinforcement filler and 10 to 40 parts by weight of a resinous adhesive polymer binder bonding said filler particles together, said filler comprising a pyrolysis or incineration residue of industrial or municipal solid waste products, said pyrolysis or incineration residue comprising at least 48 percent of silica and alumina and including a sufficient content of a plurality of different metal and metal oxide particles to significantly increase the strength of said composition in comparison to the same composition absent said metal and metal oxide particles, the majority of said filler particles having a gradation varying from −4 to 300 mesh size, said filler being characterized by non-homogeneous mesh size and individual filler particles with irregular rough shapes.

2. A composition as in claim 1 in which said binder is a thermosetting polymer.

3. A composition as in claim 1 in which said binder is selected from the group consisting of polyesters, epoxy resins, and phenolic resins.

4. A composition as in claim 1 in which said binder is a thermoplastic polymer.

5. A composition as in claim 4 in which said thermoplastic binder is selected from the group consisting of nylon, polycarbonates, acrylics, acetals, vinyls, cellulosics, styrenes, chlorinated polyethers, fluorocarbons, polypropylene and polyethylene.

6. A composition as in claim 1 in which the filler comprises silica, alumina, calcium oxide, iron oxide and carbon.

7. A composition as in claim 1 in which the filler includes ferrous and non-ferrous metals in the free state.

8. A composition as in claim 1 in the form of a self-supporting uncoated structural material.

9. A composition as in claim 1 in the form of a pipe having an inner diameter of at least 2 feet.

10. A composition as in claim 1 further comprising a pigment.

11. A composition as in claim 1 including 70 to 85 parts by weight of filler and 15 to 30 parts by weight of binder.

12. A composition as in claim 1 in which said filler is the product of pyrolysis and includes carbon.

13. In a process for forming a structural composition, the steps of
   a. intimately mixing a major portion of particulate reinforcement filler with a minor portion of flowable castable resin binder, said filler comprising the pyrolysis or incineration residue of industrial or municipal solid waste product, said pyrolysis or incineration residue comprising at least 48 percent of silica and alumina and including a sufficient content of a plurality of different metal and metal oxide particles to significantly increase the strength of said composition in comparison to the same composition absent said metal and metal oxide particles, said filler being characterized by nonhomogeneous mesh size and individual filler particles with irregular rough shapes;
   b. forming the mixture of step (a) into a desired configuration while in a flowable state; and
   c. solidifying said binder to form a solid molded structural composition in which said binder is adhesively bonded to said filler particles.

14. A process as in claim 13 in which said binder is a thermosetting polymer.

15. A process as in claim 14 in which said flowable castable binder of step (a) is a polymerizable resin precursor and said binder is solidified in step (c) by polymerizing the resin precursor.

16. A process as in claim 13 in which said binder is a thermoplastic polymer.

17. A process as in claim 13 in which said filler comprises silica, alumina, iron oxide, calcium oxide and carbon.

18. A process as in claim 13 including the step of dispersing pigment into the mixture of step (a) to provide color for the final composition.

19. A process as in claim 13 in which the resin binder precursor is selected from the group consisting of a mixture of a polyfunctional alcohol and a polyfunctional acid, a mixture of epichlorohydrin and bisphenol, a mixture of fomaldehyde and phenol.

20. A process as in claim 13 in which the resin binder precursor is a mixture of glycol, a dibasic acid, styrene and a catalyst.

21. In a process for forming a structural composition the steps of
   a. pyrolyzing or incinerating industrial or municipal solid waste products to form a particulate residue comprising at least 48 percent of silica and alumina and containing a sufficient content of a plurality of different metal and metal oxide particles to significantly increase the strength of said composition in comparison to the same composition absent said metal and metal oxide particles, the majority of said filler material having a gradation varying from −4 to 300 mesh size and individual filler particles with irregular rough shapes;
   b. intimately mixing said particulate residue as reinforcement filler with a flowable castable resin binder;
   c. forming the mixture of step (b) into a desired configuration while in a flowable state, and
   d. solidifying said binder to form a solid molded structural composition in which binder is adhesively bonded to said filler material.

22. A process as in claim 21 in which said flowable castable binder of step (a) is a polymerizable resin precursor and said binder in step (c) is solidified by a polymerizing of the resin precursor.

23. A process as in claim 22 in which said solid waste products are pyrolyzed and said particulate residue includes carbon.

* * * * *